United States Patent
Ionescu et al.

(10) Patent No.: US 10,235,218 B2
(45) Date of Patent: Mar. 19, 2019

(54) AUTOMATIC CORRECTION OF CRYPTOGRAPHIC APPLICATION PROGRAM INTERFACES

(71) Applicant: International Business Machines Corporation, Armonk, NY (US)

(72) Inventors: Paul Ionescu, Kanata (CA); Iosif V. Onut, Ottawa (CA); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 15/145,213

(22) Filed: May 3, 2016

(65) Prior Publication Data
US 2017/0322836 A1    Nov. 9, 2017

(51) Int. Cl.
*H04L 9/06* (2006.01)
*G06F 9/54* (2006.01)

(52) U.S. Cl.
CPC .............. *G06F 9/54* (2013.01); *H04L 9/0631* (2013.01); *H04L 9/0662* (2013.01)

(58) Field of Classification Search
CPC ........ H04L 9/06; H04L 63/083; G06F 21/125
USPC .................................. 713/150–155; 726/2–7
See application file for complete search history.

(56) References Cited

U.S. PATENT DOCUMENTS

| 7,207,065 | B2* | 4/2007 | Chess ................... G06F 21/577 726/22 |
| 7,818,729 | B1* | 10/2010 | Plum .................... G06F 11/3624 717/140 |
| 8,161,463 | B2* | 4/2012 | Johnson ................... G06F 21/14 717/136 |
| 8,200,727 | B2 | 6/2012 | Betouin et al. |
| 9,069,814 | B2* | 6/2015 | Wolfram ........... G06F 17/30401 |
| 9,246,686 | B1* | 1/2016 | Holland ................ H04L 9/3236 |
| 2009/0249492 | A1* | 10/2009 | Boesgaard Sorensen .................... G06F 21/556 726/27 |
| 2011/0072517 | A1* | 3/2011 | Tripp ................... G06F 11/3636 726/25 |

(Continued)

FOREIGN PATENT DOCUMENTS

CN             104484175 A        4/2015

OTHER PUBLICATIONS

Egele, et al., "An Empirical Study of Cryptographic Misuse in Android Applications," CCS'13, Nov. 4-8, 2013, 11 pages, Berlin, Germany, Copyright 2013 ACM, http://dx.doi.org/10.1145/2508859.2516693.

(Continued)

*Primary Examiner* — Lynn D Feild
*Assistant Examiner* — Viral S Lakhia
(74) *Attorney, Agent, or Firm* — Jared L. Montanaro

(57) ABSTRACT

A computer system may identify a cryptographic application programming interface (API) call for a program. The cryptographic API call may include a first variable. The computer system may determine that the first variable is a static value. The computer system may tag the first variable. The computer system may determine that the cryptographic API call will be executed. The computer system may replace the first variable with a second variable during execution of the program. The computer system may execute the cryptographic API call with the second variable.

18 Claims, 7 Drawing Sheets

(56) References Cited

U.S. PATENT DOCUMENTS

| | | | | |
|---|---|---|---|---|
| 2012/0131354 | A1* | 5/2012 | French | G06F 21/602 |
| | | | | 713/189 |
| 2013/0318139 | A1* | 11/2013 | Park | G06F 7/582 |
| | | | | 708/251 |
| 2014/0040860 | A1* | 2/2014 | Darcy | G06F 8/437 |
| | | | | 717/114 |
| 2015/0128103 | A1* | 5/2015 | Stratton | G06F 8/00 |
| | | | | 717/100 |
| 2015/0154113 | A1* | 6/2015 | Krieger | G06F 8/654 |
| | | | | 711/103 |
| 2015/0169432 | A1* | 6/2015 | Sinyagin | G06F 11/3684 |
| | | | | 717/124 |
| 2016/0019037 | A1* | 1/2016 | Varga | G06F 8/443 |
| | | | | 717/151 |
| 2016/0188872 | A1* | 6/2016 | Dobson | G06F 21/51 |
| | | | | 726/22 |
| 2017/0220806 | A1* | 8/2017 | Munoz | G06F 21/577 |
| 2017/0293546 | A1* | 10/2017 | Frontiero | G06F 11/36 |
| 2018/0082078 | A1* | 3/2018 | Suzuki | G06F 21/6227 |

OTHER PUBLICATIONS

IBM, "IBM Security AppScan Standard," last printed on Dec. 10, 2015, 2 pages http://www-03.ibm.com/software/products/en/appscan-standard/.

TIP, "A Survey of Program Slicing Techniques," Supported in part by the European Union under ESPRIT project #5399 (Compiler Generation for Parallel Machines—Compare), pp. 1-65, The Netherlands, 1995.

Unknown, "Advanced Encryption Standard," Wikipedia, the free encyclopedia, 11 pages, last modified on Nov. 26, 2015, last printed on Dec. 10, 2015, https://en.wikipedia.org/wiki/Advanced_Encryption_Standard.

Unknown, "Realtime Privacy Monitoring on Smartphones," http://www.appanalysis.org/, printed May 2, 2016 12:30 PM, 2 pgs.

Enck et al., "TaintDroid: An Information-Flow Tracking System for Realtime Privacy Monitoring on Smartphones," 15 pgs., https://www.usenix.org/legacy/event/osdi10/tech/full_papers/Enck.pdf.

* cited by examiner

| Line | Source Code |
|---|---|
| 1 | |
| 2 | int x = 3; |
| 3 | int y = 45; |
| 4 | |
| 5 | r = y − 5; |
| 6 | z = x + 1; |
| 7 | |
| 8 | seed2 = r; |
| 9 | seed1 = x + seed2; |
| 10 | |
| 11 | |
| 12 | SecureRandom sr1 = new SecureRandom (seed1); } ~302 |
| 13 | |
| 14 | |
| 15 | SecureRandom sr2 = |
| 16 |     SecureRandom.getInstance("SHA1(seed2)"); } ~304 |
| 17 | |
| 18 | |
| 19 | function getRoot2(x) { |
| 20 |     return Math.SQRT2; } ~306 |
| 21 | } |
| 22 | |
| 23 | |
| 24 | |
| 25 | |
| 26 | |

Backward Slice of Seed1

```
int x = 3;
int y = 45;

r = y – 5;

seed2 = r;
seed1 = x + seed2;

SecureRandom sr1 = new SecureRandom (seed1);  }~302
```

360

Backward Slice of Seed2

```
int y = 45;

r = y – 5;

seed2 = r;

SecureRandom sr2 =
        SecureRandom.getInstance("SHA1(seed2)");  }~304
```

FIG. 3B

| Line | Source Code |
|---|---|
| 1 | |
| 2 | int x = 3; |
| 3 | int y = 45; |
| 4 | |
| 5 | r = y – 5; |
| 6 | z = x + 1; |
| 7 | |
| 8 | seed2 = r; |
| 9 | seed1 = x + seed2; |
| 10 |     Tainted.put(seed1, true);  } ~320 |
| 11 | |
| 12 | |
| 13 | |
| 14 | SecureRandom sr1 = new SecureRandom (seed1); } ~302 |
| 15 | |
| 16 | |
| 17 | SecureRandom sr2 = |
| 18 |     SecureRandom.getInstance("SHA1(seed2)"); } ~304 |
| 19 | |
| 20 | |
| 21 | function getRoot2(x) { |
| 22 |     return Math.SQRT2; } ~306 |
| 23 | } |
| 24 | |
| 25 | |
| 26 | |
| 27 | |

300

| Memory | | |
|---|---|---|
| Variable | Used? | Tainted? |
| seed1 | Yes | Yes |

| Line | Source Code |
|---|---|
| 1 | |
| 2 | int x = 3; |
| 3 | int y = 45; |
| 4 | |
| 5 | r = y − 5; |
| 6 | z = x + 1; |
| 7 | |
| 8 | seed2 = r; |
| 9 | seed1 = x + seed2; |
| 10 |     Tainted.put(seed1, true); } ~320 |
| 11 | |
| 12 | |
| 13 | |
| 14 | int randomSeed1 = RandomNumber.nextInt(12) + 1; } ~330 |
| 15 | |
| 16 | SecureRandom sr1 = new SecureRandom (randomSeed1); } ~302 |
| 17 | |
| 18 | |
| 19 | SecureRandom sr2 = |
| 20 |     SecureRandom.getInstance("SHA1(seed2)"); } ~304 |
| 21 | |
| 22 | |
| 23 | function getRoot2(x) { |
| 24 |     return Math.SQRT2; } ~306 |
| 25 | } |
| 26 | |
| 27 | |

FIG. 3D

AUTOMATIC CORRECTION OF CRYPTOGRAPHIC APPLICATION PROGRAM INTERFACES

BACKGROUND

The present disclosure relates generally to the field of computer software, and more specifically to replacing non-cryptographically secure inputs in a cryptographic application programming interface (API) call with cryptographically secure inputs.

Cryptographic APIs are pieces of functionality that serve to secure sensitive data, such as passwords and personal information. Cryptographic APIs may have a set of libraries (e.g., dynamically linked libraries) that provide an abstraction layer which isolates programmers from the code used to encrypt data. Cryptographic APIs may utilize numerous methods for encrypting and decrypting data (e.g., using public-key or symmetric key cryptography). Cryptographic APIs may additionally provide functionality for encrypting and decrypting data, and for authentication, using digital certificates.

SUMMARY

Embodiments of the present invention disclose a method, computer program product, and system for replacing cryptographically insecure inputs in cryptographic application programming interface (API) calls with cryptographically secure inputs. A computer system may identify a cryptographic API call for a program. The cryptographic API call may include a first variable as an input. The computer system may determine that the first variable references a static value. The computer system may tag the first variable. The computer system may determine that the cryptographic API call will be executed. The computer system may replace the first variable with a second variable during execution of the program. The computer system may execute the cryptographic API call with the second variable.

In some embodiments, a system may include a memory and a processor in communication with the memory. The processor may identify a cryptographic API call in a source code for a program. The cryptographic API call may include a first variable as an input. The processor may determine that the first variable references a static value. The processor may generate a second variable using a cryptographically secure pseudo-random number generator. The processor may replace the first variable with the second variable.

In some embodiments, a computer program product may include a computer readable storage medium having program instructions. The program instructions may be executable by a processor. The processor may identify that a cryptographic API call in a program is being executed. The cryptographic API call having a first variable as an input. The processor may determine that the first variable has been tagged as tainted. The processor may replace the first variable with a second variable during execution of the program. The processor may execute the cryptographic API call with the second variable as the input.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 3A illustrates an example of source code for a program having cryptographic API calls and a non-cryptographic API call, in accordance with embodiments of the present disclosure.

FIG. 3B illustrates an example of a backward slice of the tainted seeds used as inputs for cryptographic API calls from FIG. 3A, in accordance with embodiments of the present disclosure.

FIG. 3C illustrates an example of taint tags marking tainted variables used by the cryptographic API calls as inputs, in accordance with embodiments of the present disclosure.

FIG. 3D illustrates an example of statements for random number generators being inserted into source code of the program to generate cryptographically secure variables, in accordance with embodiments of the present disclosure.

Figure 1:
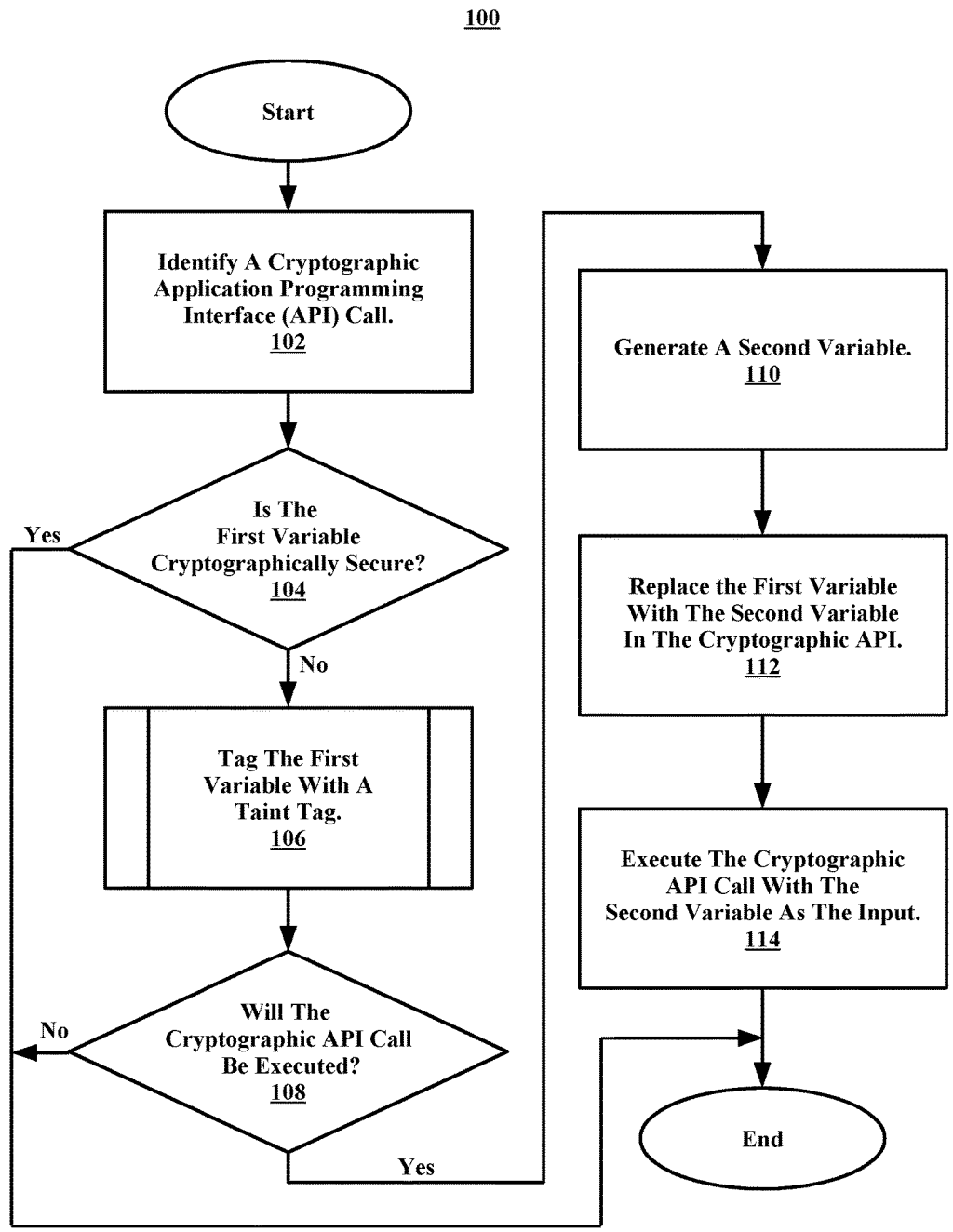
FIG. 1 illustrates a flowchart depicting an example method for replacing a tainted variable used as an input for a cryptographic application programming interface (API) call with cryptographically secure variable, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer software security, and more specifically to replacing non-cryptographically secure inputs in cryptographic application programming interface (API) calls with cryptographically secure inputs. While the present disclosure is not necessarily limited to such applications, various aspects of the disclosure may be appreciated through a discussion of various examples using this context.

Cryptographic APIs are pieces of functionality that serve to secure sensitive data, such as passwords and personal information. However, many programs using cryptographic APIs are not actually secure due to the deterministic nature of some encryption methods. In other words, a cryptographic API call that uses the same input may always produce the same output. As such, a common misuse made by a program may relate to the use of a non-cryptographically secure variable (e.g., a static value) as an input for the cryptographic API, which may produce the same deterministic output. In some embodiments, this may be the use of a non-random initialization vector for encryption algorithms (e.g., Advanced Encryption Standard [AES], Cipher Block Chaining [CBC], etc.). An initialization vector should be an unpredictable random number that produces a different ciphertext for every piece of information that may be encrypted. However, there may be a flaw in the initialization vector, which produces the same ciphertext for the same corresponding information making the ciphertext relatively easy to decrypt.

For example, the each line of the following conversation may be encrypted with an initialization vector of [001] and cypher block chaining:

Person 1: "Hi."
Person 2: "Hi, how are you?"
Person 1: "Good."

Accordingly, the outputted, encrypted conversation may appear as:

Person 1: ABC
Person 2: ABC, GHE BPO WER
Person 2: YTRE

Due to the initialization vector being static and the deterministic nature of the encryption algorithm used, the output corresponding to "Hi" in the conversation is repeated and has the same ciphertext of "ABC" in two areas. The repeated ciphertext of "ABC" leaves the entire encrypted conversation vulnerable to decryption. An attacker could use the ciphertext and work backwards through the cipher block chaining method to determine the initialization vector of [001]. Because the same initialization vector was used to encrypt the entire conversation, the attacker may then be able to decrypt the entire conversation. Whereas, if each line of the conversation had been encrypted using a different initialization vector, the conversation would be less vulnerable to decryption.

In some embodiments, misuse of a cryptographic API may also happen if a static salt is used for password-based encryption. A salt is a value that should be randomly generated and combined with a password in some way to produce a hash value (e.g., the value corresponding to a password that is saved). For example, a salt may be "1234," a password may be "Bird," and using the hash function of "hash(salt∥password)," the password may be stored for a first time as the hash value of "Bi12rd34." The password may then be stored for a second time as the same hash value of "Bi12rd34" because the salt is static. An attacker may be able to identify the consistency of the hash value and decrypt the original password of "Bird."

In some embodiments, a cryptographic API may be misused when a static encryption key is used. In symmetric encryption schemes (e.g., where the same key encrypts and decrypts the information), an encryption key may be a password that is salted using a key derivative function that may change the ciphertext of the encoded information. If the key derivative function salts the password with a static value, the ciphertext may not be random and an attacker may be able to find the password, leaving the encoded information vulnerable to possible decryption.

In some embodiments, cryptographic API misuse may also occur when a static seed value is used in a SecureRandom class. SecureRandom is a class that generates pseudo-random numbers using a deterministic encryption algorithm for use by a program. When a static seed value is used to start the generation of a pseudo-random number, the program is not cryptographically secure. For example, SecureRandom may use a static seed of 3. The program may use "SecureRandom(3)" to produce a value of 17 for every instruction in the program that uses "SecureRandom(3)." Effectively, the program has exchanged the static value of 3 for the static value of 17, and the program may be no more secure than if there was no SecureRandom class.

In order to solve such misuses of cryptographic APIs, a processor may identify a cryptographic API call in a source code for a program. The cryptographic API call may have a first variable as an input. The processor may determine that the first variable is cryptographically insecure and tag the first variable as being insecure. In some embodiments, the first variable may be cryptographically insecure because it references (e.g., it is) a static value (also referred to as a constant value). For example, the processor may, in a static analysis environment (e.g., without executing the program), compute a backward slice starting at the cryptographic API call, and it may determine that the first variable for the cryptographic API call references a static value. The processor may then tag the first variable with a taint tag, marking the first variable as tainted and not cryptographically secure (e.g., not to be used by the cryptographic API call as an input).

The processor (or a different processor) may execute the program while monitoring the tagged variable and determine that the cryptographic API call will be executed with the tagged variable as an input. During execution, the processor may replace the static variable with a newly generated random (or pseudo-random) variable. The cryptographic API call may continue to be executed with the random variable as the input for the cryptographic API call. For example, a program may have been executed and a processor may determine that the tagged variable is the static value of 10 and is about to be used by the cryptographic API call as an input. The processor may use a pseudo-random number generator to produce a random value of 26, and it may replace the static value of 10 with the random value of 26. The cryptographic API call may then be executed with the random value of 26 as an input, and the program may continue to run to completion without being cryptographically insecure due to the static value of 10.

The cryptographic API call may be called again, and a new random number may be generated. For example, the program (or subroutine) may have been executed again, and the processor may determine that the tagged static value of 10 is about to be used by the cryptographic API call as an input. The processor may use the pseudo-random number generator to produce a random variable of 78 now, and it may replace the static value of 10 with the random value of 78 as the input, and the program may continue to run to completion without being cryptographically insecure. This cycle may be repeated for as many times as the cryptographic API call may be used by the program, such that each time a tagged static value is set to be used, a new random value will be generated and used as the input.

Referring now to FIG. 1, illustrated is a flowchart of an example method 100 for replacing a tainted variable used as an input for a cryptographic API call with a cryptographically secure variable, according to embodiments. A computer system may perform the method 100. In some embodiments, one or more operations in the method 100 may be performed by a user. In other embodiments, one or more operations in the method 100 may be performed by the computer system in response to user input. The method 100 may begin at operation 102, where the computer system may identify a cryptographic API call in source code for a program. The cryptographic API call may include a first variable as an input (e.g., as a seed/salt).

In some embodiments, the computer system may identify the cryptographic API call by static analysis of the source code for the program. The computer system may identify a cryptographic API call by its use of encryption algorithms (e.g., AES, CBC, etc.), encryption keys (e.g., for symmetric encryption schemes), salts (e.g., for password security), and/or encryption methods (e.g., SecureRandom). In some embodiments, the cryptographic API call may be identified by the computer system accessing a library used by the program or cryptographic API call (e.g., a collection of precompiled routines, subroutines, and calls that may be used by the program or cryptographic API call). The computer system may analyze a list of API calls in the library and detect one or more cryptographic API calls in the list of API calls. Upon detecting the one or more cryptographic API calls in the library, the computer system may perform a static analysis of the source code of the program to determine if a cryptographic API call is in the source code.

After identifying a cryptographic API call at operation 102, the computer system may determine whether the first variable is cryptographically secure (e.g., if the first variable does not reference a static value) at decision block 104. In some embodiments, the first variable may not be cryptographically secure as an input if it references a static value. An attacker may be able to trace the cryptographic API call back to the static value and may use the static value as a hook for decoding the entire program. That is, the attacker may now have a point of reference (e.g., the static value) to be able to manipulate the static value and change the behavior of the cryptographic API call, leaving the program executing the cryptographic API call vulnerable to decryption.

In some embodiments, static analysis (e.g., analysis done without executing the program) may be used to trace the cryptographic API call back to a static value input. The static analysis may include performing a backward slice of the cryptographic API call to determine if the first variable references a static value. For example, a program may perform a static analysis of have the following data:
"Good day,"
"Goodbye," and
"Good to meet you."
The program may be encrypted by using the AES algorithm and a static initialization vector of [011] (e.g., a first variable).
The encrypted data when outputted by the encryption algorithm and initialization vector [011] may be:
5678123,
5678099,
5678456694012,
A processor may perform a static analysis of the encrypted data and may be able to identify the repetition of 5678 associated with "Good" for each line of data in the encrypted program. The processor may also identify the AES algorithm as being used for generating the encryption. Using the static output of 5678 and the AES algorithm, the processor may take a backward slice of the program. Starting at one of the 5678 outputs, the processor may examine one or more statements that affect the 5678 output, examining back to the initialization vector of [011]. The processor may then determine that the initialization vector, when used by the cryptographic API call, causes the program to be non-cryptographically secure because it has a first variable input that references a static initialization vector input.

For example, a program may be written in C language and include an XOR encryption call (e.g., a type of cryptographic API call). A computer system analyzing the program may access a library (or API) containing calls written in C and examine a list of API calls in the library. The computer system may detect one or more cryptographic API calls in the list of API calls, including the XOR encryption call. The computer system, after detecting the XOR encryption call in the library, may perform a static analysis of the source code starting at the XOR encryption call to determine if the XOR encryption call uses a static value as a input.

In some embodiments, the processor may determine if the first variable references a static value by performing a backward slice at the cryptographic API call and examining the statement(s) that affect the cryptographic API call's input (e.g., the first variable). The processor may then determine if the statement(s), when executed, cause the first variable to be cryptographically secure (e.g., the first variable references a random or pseudo-random number). For example, a processor may analyze a cryptographic API call of SecureRandom(Seed), where Seed may be a first variable and may be affected by the statements Seed=5−z, and z=4. The processor may determine that the statement, when executed, causes Seed to be cryptographically insecure because a static value of 1 is always produced for Seed due to the deterministic nature of the SecureRandom class (e.g., Seed=5−4=1).

In some embodiments, the computer system may execute the one or more statements found to affect the value of the input (e.g., Seed). The statements may be executed alone (e.g., without execution of any other statements in the program) multiple times (e.g., at least two times). The computer system may then compare the results of the two or more executions to determine whether the results are random or pseudo-random. In other words, the computer system may execute the statements that affect the value of Seed multiple times, and record the final value for Seed for each iteration. The computer system may then compare the final values for Seed to determine whether the statements produce a static value (e.g., the final value for Seed is the same every time), a cryptographically insecure non-static value (e.g., the value for Seed increases by a set amount each iteration), or a pseudo-random value.

In some embodiments, the computer system may determine that the first variable is not cryptographically secure despite being generated using a pseudo-random number generator. For example, a pseudo-random number generator may use the secure hash algorithm 1 (SHA-1) to generate the first variable. However, SHA-1 is known as being a broken algorithm (e.g., the information hashed with SHA-1 can be easily be deciphered and is not cryptographically secure). The computer system may identify SHA-1 as a broken algorithm used in the pseudo-random number generator and determine that the first variable is not cryptographically secure despite being generated by the pseudo-random number generator.

In some embodiments, if the first variable is determined to be cryptographically secure (e.g., not referencing a static value), at decision block 104, the method 100 may end. If, at decision block 104, the first variable is determined not to be cryptographically secure, the method 100 may continue to operation 106. At operation 106, the first variable may be tagged with a taint tag indicating that the first variable is not cryptographically secure and should not be used as an input for the cryptographic API call. Tagging the first variable with a taint tag is discussed further in reference to FIG. 2.

After tagging the first variable with a taint tag at operation 106, the computer system may determine at decision block 108 whether the cryptographic API call will be executed (e.g., or scheduled for execution). For example, a processor may execute a program and track the tagged first variable used as an input in the cryptographic API call. The processor may determine that the cryptographic API call is next to be executed by the program because of the tagged first variable. If the cryptographic API call is not going to be executed, the method 100 may end. If, at decision block 108, it is determined that the cryptographic API call is going to be executed, the method 100 may continue to operation 110. In some embodiments, it may be determined at decision block 108 that the cryptographic API call will be executed by the cryptographic API call being in the source code of the program (e.g., the existence of the cryptographic API call in the source code indicates to the computer system that the cryptographic API will be executed by the program).

In some embodiments, the computer system may generate a list of tainted variables. If the cryptographic API call is executed, the computer system may analyze the list of tainted variables to determine if a tainted variable is used by the cryptographic API call. If the cryptographic API call does not use a tainted variable in the list of tainted variables, the method 100 may end. If the cryptographic API call is going to be executed with a tainted variable in the list of tainted variables, the method 100 may continue to operation 110.

After determining that the cryptographic API call will be executed at decision block 108, the computer system may generate a second variable to replace the first variable at operation 110. In some embodiments, the second variable may reference a random or pseudo-random value automatically generated by the computer system. For example, a processor in the computer system may generate a second variable using a pseudo-random number generator that produces cryptographically secure values. In some embodiments, the computer may recognize a difference between a pseudo-random number generator and a cryptographically secure pseudo-random number generator. Accordingly, the computer may generate the second variable using a cryptographically secure pseudo-random number generator.

In other embodiments, the second variable may reference a random or pseudo-random value seeded by a user. For example, the cryptographic API call may include a Secure-Random(seed) statement, where the seed is the first variable and references a static value of 45. The computer system may produce a random seed using the formula:

$$seed = \sum_{1 \le i \le 103, i\ odd} f(i)$$

wherein, $f(i)=i^2$ and i is the index of summation. The user may be prompted by the computer system to select a value for i and may select i=5. The computer system may now use 35 as the pseudo-random seed value (e.g., $1^2+3^2+5^2=1+9+25=35$).

In some embodiments, the second variable may be associated to the response time of the user. For example, a computer system may prompt a user to push a yes button, confirming that the computer system is allowed to replace a first variable with a second variable. The computer system may take the time it took the user to press the button to the nearest nanosecond (e.g., 1.123456789), and generate the second variable using the time. In this way the second variable may reference a pseudo-randomly generated value and may therein secure the cryptographic API call.

In some embodiments, the program executing the cryptographic API call is on a mobile device. The program may generate the second variable by prompting the user to solve a puzzle game, the number of moves made by the user being the second variable. For example, a cryptographic API call is about to be executed with a tainted first variable, a program running the cryptographic API call prompts the user to solve a game. The user may take 4 moves to solve the game, and the program may use 4 as a value referenced by the second variable to replace the tainted first variable. In some embodiments, the computer system may determine both the amount of time it takes to solve the puzzle, as well as the number of moves taken, to generate the second variable. For example, the computer system may determine the amount of time needed to solve the puzzle (e.g., in milliseconds) and the number of moves needed. The computer system may then raise the amount of time in milliseconds to a power equal to the number of moves. For example, if it took a user 2.134 seconds (i.e., 2,134 ms) and 2 moves to solve a puzzle, the computer system may determine that the second variable is 4553956 (i.e., 2134 squared).

After generating a second variable at operation 110, the method 100 may continue to operation 112, where the first variable in the cryptographic API call may be replaced automatically with the second variable. In some embodiments, the first variable may be replaced during execution of the program. This may be done by removing the first variable from the cryptographic API call and inserting the second variable into the cryptographic API call. In some embodiments, the first variable is replaced by the second variable automatically upon generation of the second variable at operation 110. In some embodiments, the first variable may be left in other statements throughout the source code that use the first variable as non-cryptographic API call inputs.

For example, a cryptographic API call may use a first variable that references the static value of 30. Additionally, a non-cryptographic API call may also use the first variable to indicate that a function is to perform 30 iterations. The computer system may replace the first variable referencing the static value of 30 with a pseudo-random generated value in the cryptographic API call and leave the first variable of 30 in the non-cryptographic API call. This may be done so the cryptographic API call is cryptographically secure with a pseudo-random generated value, and the non-cryptographic API call may perform the designated 30 iterations correctly. Had the first variable been completely removed from the program and replaced with a random variable, the non-cryptographic API call may have executed improperly.

In some embodiments, operations 110 and 112 may be performed together. For example, a statement may be SecureRandom(variable1), and variable1 may be tainted. A computer system may insert a pseudo-random number generator into the statement, making the statement read SecureRandom(PRNG(variable1)). Even though variable1 is tainted, it may now be transformed by a non-deterministic function, and the pseudo-random number generator may generate a second variable at the same time as replacing variable1.

After replacing the first variable with a second variable at operation 112, the cryptographic API call may be executed with the second variable as an input at operation 114. In some embodiments, execution of the cryptographic API call may continue with the normal execution of the call stack of the program. For example, a cryptographic API call may be the next call in a program to be executed. A computer system may have replaced a first variable in the cryptographic API call with a second variable while the cryptographic API call was still the next call to be executed. The program may continue to execute the cryptographic API call next with the second variable, without slowing the program performance or having to rearrange the call stack.

In some embodiments, the computer system may include memory that may include a compiler, which may take the source code of the program and generate object code. For example, a compiler may identify a cryptographic API call in a source code for a program, where the cryptographic API call has a first variable as an input. The compiler may generate a second variable using a cryptographically secure pseudo-random number generator and replace the first variable with a second variable. In some embodiments, the compiler may tag the first variable as tainted instead of replacing the first variable with the second variable. In some embodiments, the compiler may perform all the steps of method 100, excluding operation 114, before generating the object code. This may allow the compiler to generate cryptographically secure object code that may be used by any other device (e.g., mobile device) without the device needing to check cryptographic security. In some embodiments, the computer system may be coupled to another device to communicatively transmit the block code to the other device that will execute the block code.

In some embodiments, the mobile device may execute the object code. For example, a computer system (e.g., a mobile device) may identify that a cryptographic API call in the program is being executed with a first variable as an input. The mobile device may determine that the first variable has been tagged as tainted (e.g., because of the compiler when generating the object code) and replace the first variable with a second variable during the execution of the program. After replacing the first variable with the second variable, the mobile device may continue to execute the cryptographic API call with the second variable as the input.

Figure 2:
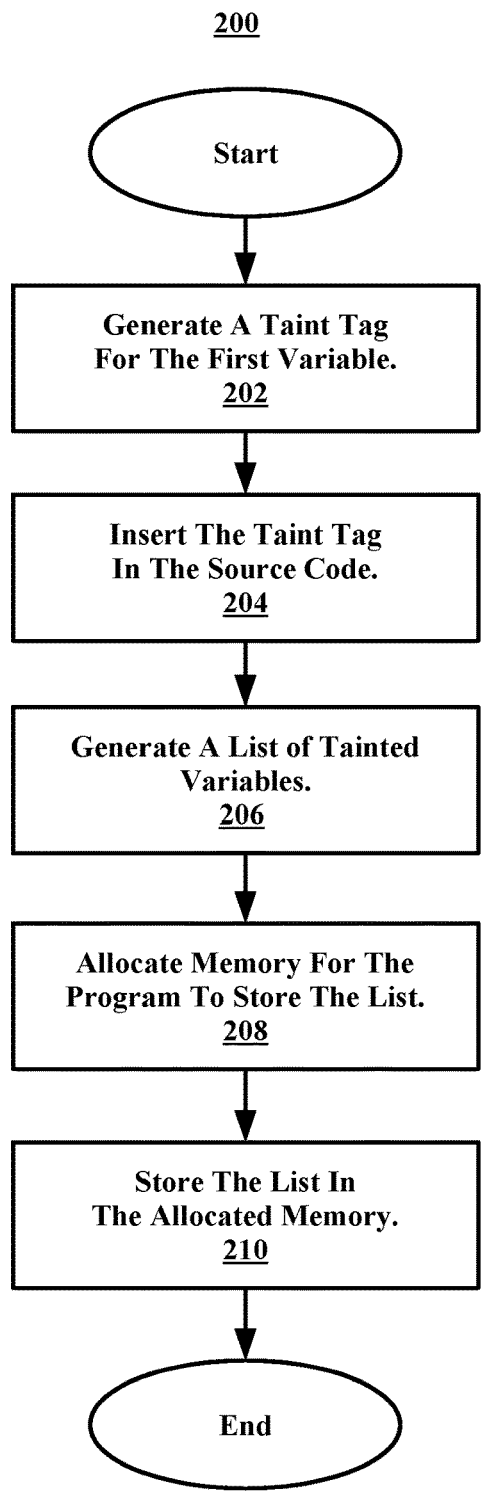
FIG. 2 illustrates a flowchart of an example method for tagging a first variable with a taint tag, in accordance with embodiments of the present disclosure.

Referring now to FIG. 2, illustrated is a flowchart of an example method 200 for tagging a first variable with a taint tag. The first variable may be a tainted input that is used by a cryptographic API call in a program. In some embodiments, the tagging of the first variable may be performed during a static analysis of the program as part of operation 106 of method 100 (shown in FIG. 1). In some embodiments, the tagging of the first variable may be performed during execution of the program.

At operation 202 of the method 200, a taint tag may be generated for a first variable. The first variable may be the same as the first variable identified as being cryptographically insecure in decision block 104 of FIG. 1. The processor may mark the first variable with the taint tag. The taint tag may be a statement indicating that the first variable references a static value. The taint tag may also indicate that the first variable should be put into a list of tainted variables if it is true that the first variable is used (or going to be used) as an input.

After generating the taint tag at operation 202, the taint tag may be inserted into the source code of the program at operation 204. In some embodiments, the taint tag may be inserted as a comment to the statement of the first variable. For example, a first variable may be a static value that inputs into a cryptographic API call, and a processor may generate a taint tag. The processor may insert the taint tag as the comment, "//first variable is tainted//" into the text of the source code of the program running the cryptographic API call. The taint tag may indicate to a user that the first variable is a static value and should not be used as the cryptographic API call input.

In some embodiments, the taint tag may be inserted into the source code of the program running the cryptographic API call as a line of code. For example, a first variable may reference a static value that inputs into a cryptographic API call, and a processor may generate a taint tag. The processor may insert the taint tag as the line of code, "tainted.put(first variable, true)" into the source code of the program running the cryptographic API call. The taint tag may indicate to the processor that the first variable references a static value and should not be used as the cryptographic API call input. The taint tag may also direct the processor to put the first variable in a list of tainted variables.

After inserting the taint tag into the source code at operation 204, a list of tainted variables may be generated at operation 206. In some embodiments, the list of tainted variables may be a table of all variables used in the program. The table may indicate if each variable is tainted and used by a cryptographic API call in the program. In other embodiments, the list of tainted variables may be a table that only includes tainted variables.

For example, a program may use three variables: Seed1, Seed2, Seed3. Seed1 and Seed2 may reference static values. Seed3 may reference a pseudo-random number generator, a non-static value. Seed1 may be used by a cryptographic API call in the program and Seed2 and Seed3 may be used by non-cryptographic API calls in the program. A processor may generate a table with column one indicating the names of the three variables, column two indicating if the variables are tainted (e.g. static values), and column three indicating if the variables are used by a cryptographic API call. Table 1 below illustrates the resulting example of a generated table.

TABLE 1

| Variable | Tainted? | Used? |
| --- | --- | --- |
| Seed1 | Yes | Yes |
| Seed2 | Yes | No |
| Seed3 | No | No |

The processor may use Table 1 to determine which variable(s) needs to be replaced in method 100. The processor may identify Seed1 as both tainted and used by a cryptographic API call and produce a second variable to replace Seed1. The processor may also identify Seed2 and Seed3 as not needing replacement because, despite the fact that Seed2 may reference a static value, it is not used by a cryptographic API call, and Seed3 is neither tainted nor used by a cryptographic API call.

In some embodiments, the list may be generated as the taint tags become executed. For example, a tainted variable, Static, may be tagged with a taint tag. The taint tag may be inserted into source code of a program as the statement, tainted.put(Static, true). The taint tag may execute when it becomes true that the tainted variable may be used by the cryptographic API call during execution of the program. A processor may identify Static as about to be used by the cryptographic API call, and the taint tag may be executed, putting Static in a list of tainted variables. The list of tainted variables may indicate that Static should not be used for the cryptographic API call during other runs or iterations of the program.

After generating a list of tainted variables at operation 206, memory for the program may be allocated to store the list at operation 208. For example, 512 mb of RAM may be allocated for a cryptographically secure application (e.g., the program). After analyzing the application, it may be determined that 3 cryptographic API call inputs reference static values and they may be tagged as tainted. A list may be generated showing the 3 inputs as tainted variables and 16 mb of RAM may be allocated to store the list in the program. One of ordinary skill in the art would recognize that different types of memory may be used, and the amount of memory may be more or less than what is discussed above. Accordingly, the present disclosure should not be construed as limited to the particular examples discussed herein.

After allocating memory to store the list at operation 208, the list may be stored in the allocated memory at operation 210. Following the example presented at operation 208, the list of the 3 tainted inputs may be stored in the 16 mb of RAM. Storing the tainted inputs in a table within the allocated memory may help a processor identify the tainted inputs relatively faster than other methods understood by one skilled in the art (e.g., reevaluating the program during execution to identify the tainted inputs). For example, during a first execution of a program, it may take 2 nanoseconds for a processor to identify a tainted variable as about to flow into a cryptographic API call and put the tainted variable into a list of tainted variables. On a second execution of the program, it may take 1 nanosecond for the processor to identify the tainted variable because the tainted variable has already been identified as going to flow into the cryptographic API call. After storing the list of tainted variable in memory at operation 210, the method 200 may end.

Referring now to FIG. 3A, illustrated is an example of source code 300, which may be used in step 102 of method 100 to identify a cryptographic API call, according to embodiments of the present disclosure. The source code 300 includes a first cryptographic API call 302, a second cryptographic API call 304, and a non-cryptographic API call 306. The first cryptographic API call 302 may be seeded with seed1, the second cryptographic API call 304 may be seeded with SHA1(seed2), and the non-cryptographic API call 306 may be seeded with integer x. Seed1 may be produced by the function seed1=x+seed2, where x=3 and seed2=r. Variable r may be determined by the function r=y−5, where y=45.

A processor may identify the first cryptographic API call 302 as a cryptographic API call by the SecureRandom class used by the statement. For example, the processor may search a library for a list of enabled APIs or cryptographic API calls. The processor may determine, from the search, that SecureRandom is a cryptographic API call used to generate a random number for cryptographic security. In some embodiments, the processor may also identify the second cryptographic API call 304 as a cryptographic API call by finding the secure hash algorithm 1 (SHA-1) listed in the library. The SHA-1 may be used to cryptographically secure information. In some embodiments, the processor may also determine that non-cryptographic API call 306 does not contain a cryptographic API call by searching the library and not finding a matching cryptographic API call for the square root function of non-cryptographic API call 306.

Referring now to FIG. 3B, illustrated is an example of a backward slice 350 of seed1 and a backward slice 360 of seed2, which may be used in step 104 of method 100, according to embodiments of the present disclosure. In some embodiments, during static analysis of the source code, a processor may identify the first cryptographic API call 302 as needing a cryptographically secure input. A cryptographically secure input may be needed because of the deterministic nature of the first cryptographic API call 302, wherein if a static input is used the same output will be generated for every use of the first cryptographic API call 302. The processor may identify seed1 as the input for the first cryptographic API call 302 and perform a backward slice to determine if seed1 is cryptographically secure.

For example, a processor may begin backward slicing of the first cryptographic API call 302 by determining which statements affect the input seed1. The processor may determine that seed1 is affected by the statements seed1=x+seed2 and int x=3. The processor may then analyze seed2 to determine seed2=40 (e.g., seed2=r, r=y−5, and y=45; therefore seed2=45−5=40). Applying seed2 to the statement seed1=x+seed2, the processor may determine the value referenced by seed1 is 43, a static value (e.g., seed1=3+40=43), making the first cryptographic API call 302 cryptographically insecure.

In some embodiments, the processor may analyze the statements in the backward slice 360 to determine if the second cryptographic API call 304 is cryptographically secure. For example, after backward slicing the first cryptographic API call 302, the processor may backward slice the second cryptographic API call 304. The processor may determine that seed2 references 40 (as shown above), which is a static value. The processor may also determine that SHA-1 is a part of the input used by the second cryptographic API call 304 and SHA-1 is not a deterministic function. That is, a static value may be used as an input because the output will be different for each use of the second cryptographic API call 304, leaving the second cryptographic API call 304 cryptographically secure.

In some embodiments, the processor may determine not to perform backward slicing of the non-cryptographic API call 306 (shown in FIG. 3A) because the non-cryptographic API call 306 does not need to be cryptographically secure. That is, integer x may be an input and integer x may be the static value of 3, but non-cryptographic API call 306 does not need to be cryptographically secure, therefore it may not warrant static analysis by the processor.

Referring now to FIG. 3C, illustrated is an example of source code 300 that includes a first cryptographic API call 302, a second cryptographic API call 304, and a non-cryptographic API call 306, in accordance with embodiments of the present disclosure. Source code 300 may also include a taint tag 320 associated with seed1. In some embodiments, the taint tag 320 may be substantially similar to the taint tag described in operation 204 of method 200 (shown in FIG. 2). Additionally illustrated in FIG. 3C is an example of allocated memory as a table 370 that lists information about the tainted variable seed1. In some embodiments, table 370 may be substantially similar to the table described in operation 208 of method 200. A person having ordinary skill in the art would recognize that the allocated memory does not have to store, use, or display information in a table format, and the table 370 is shown for illustrative purposes.

In some embodiments, a processor may generate the taint tag 320 after seed1 is determined to be a static value, as discussing in reference to FIG. 3B. For example, seed1 may be determined to reference a static value input for the first cryptographic API call 302. A processor may generate the taint tag 320 for seed1 as the statement "tainted.put(seed1, true)". The processor may insert the taint tag 320 into the source code 300 above the cryptographic API call 302 using seed1.

The processor may not generate a taint tag for the input, SHA1(seed2), because SHA1(seed2) is not tainted. The second cryptographic API call 304 may use the static value referenced by seed2, as an input. However, the processor may determine that the SHA-1 algorithm, which modifies seed2 before it is used by the second cryptographic API call 304, is non-deterministic and maintains the cryptographic security of the second cryptographic API call 304. In some embodiments, the processor may generate a taint tag for the SHA1(seed2) because the SHA-1 algorithm may be known as broken. That is, an attacker may have determined the possible outcomes from the SHA-1 algorithm for a given input (e.g., static value seed2). Additionally, the processor may not generate a taint tag for integer x because the processor may identify non-cryptographic API call 306 as not needing to be cryptographically secure. Accordingly, the static value of integer x may be used as the input for non-cryptographic API call 306.

In some embodiments, memory may be allocated to store a list of tainted variables. The list generated by the processor may be stored in the table 370. As the processor executes the taint tag 320, the table 370 may populate seed1 into column one as the name of the tainted variable. The table 370 may also verify if seed1 as an input used by the first cryptographic API call 302 and if seed1 is a tainted input.

For example, column one of the table 370 may list seed1 as the name of the tainted variable. Column two of the table 370 may indicate that seed1 is used by a cryptographic API call (e.g., the first cryptographic API call 302) as an input. Column three of the table 370 may indicate that seed1 taints the first cryptographic API call 302 (e.g., by referencing the static value of 43, as discussed in FIG. 3B). SHA1(seed2) may not be listed in the table 370 because it uses SHA-1 (e.g., a non-deterministic algorithm) with seed2 to generate a cryptographically secure input for the second cryptographic API call 304. In some embodiments, the table 370 may list all variables in the program and indicate whether each variable is used by a cryptographic API call and whether the variable taints the cryptographic API call (e.g., is a tainted variable), as referenced in Table 1.

Referring now to FIG. 3D, illustrated is an example of source code 300 that includes a first cryptographic API call 302, a second cryptographic API call 304, and a non-cryptographic API call 306, in accordance with embodiments of the present disclosure. Source code 300 may also include a taint tag 320 associated with seed1 and a random number generator 330.

In some embodiments, the processor may generate a statement for the random number generator 330. The processor may use the random number generator 330 to generate randomSeed1. The processor may additionally replace seed1 with randomSeed1 as an input for the first cryptographic API call 302, while leaving seed1 in other API calls using seed1 as an input. The processor may replace seed1 with randomSeed1 in order to maintain the security of the first cryptographic API call 302.

For example, during static analysis of a program, it may be determined by a processor that the first cryptographic API call 302 in the program may reference a static value as an input (e.g., seed1), and seed1 may be marked with the taint tag 320. The processor may additionally insert the random number generator 330 above the first cryptographic API call 302. During execution of the program, the taint tag 320 may be executed, triggering the processor to execute the random number generator 330 to generate randomSeed1. The random number generator 330 may also replace seed1 with randomSeed1. The processor may then continue executing the program with randomSeed1 as an input for the first cryptographic API call 302. RandomSeed1 may reestablish the cryptographic security for the first cryptographic API call 302 and the program. In some embodiments, the processor may override seed1 with randomSeed1 in the first cryptographic API call 302 by annotating seed1.

Figure 4:
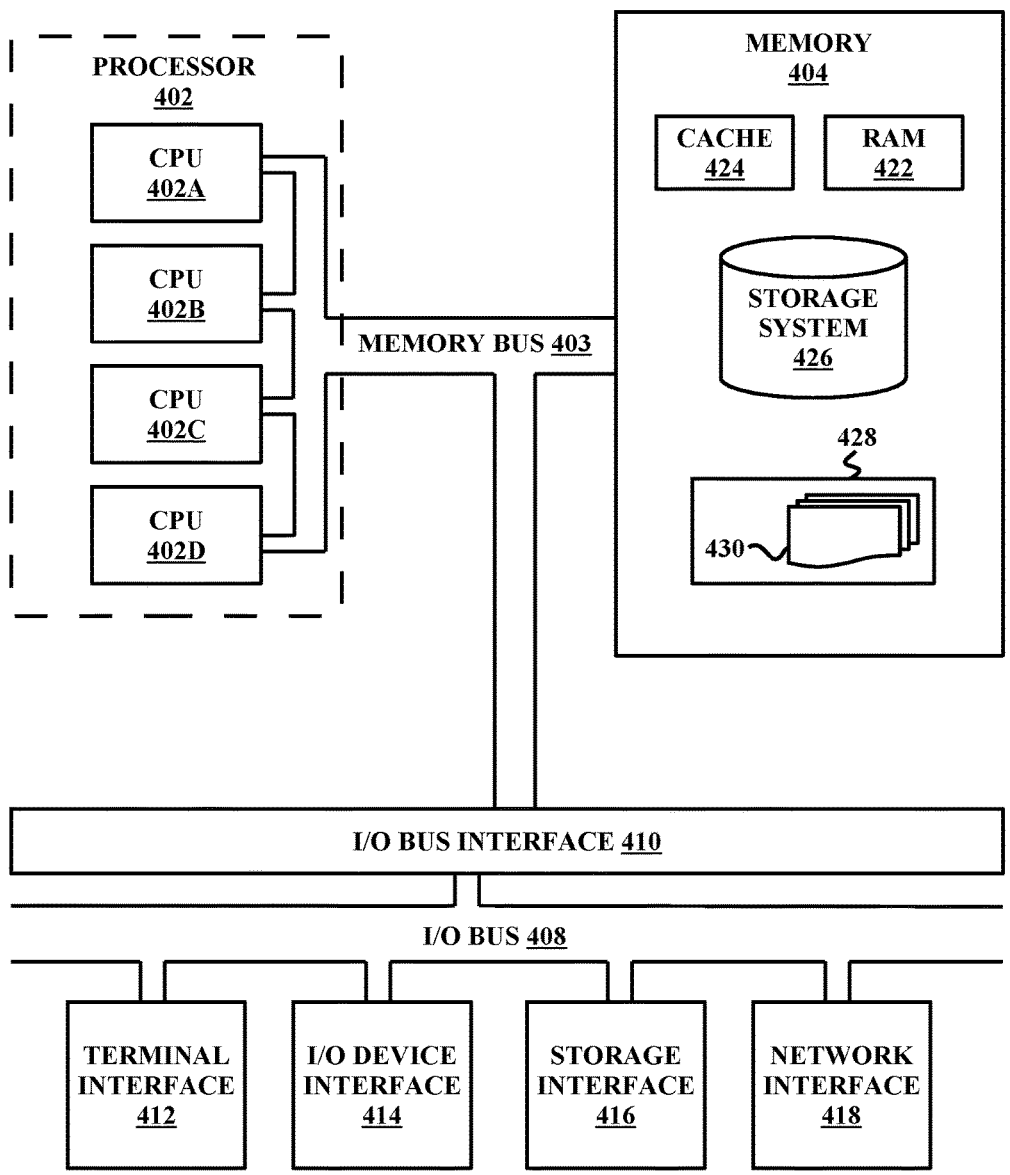
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   identifying, by a processor, a cryptographic application program interface (API) call in a source code for a program, the cryptographic API call having a first variable as an input;
   determining that the first variable is a static value, wherein determining the first variable is the static value includes performing a static analysis of the program, the static analysis including a backward slice of the input of the cryptographic API call, and wherein performing the static analysis of the program comprises:
      examining, by the processor, one or more statements in the program that affect the first variable, and
      determining whether the one or more statements, when executed, cause the first variable to be a cryptographically secure value;
   tagging the first variable;
   determining that the cryptographic API call will be executed;
   replacing the first variable with a second variable during execution of the program; and
   executing the cryptographic API call with the second variable as the input.

2. The method of claim 1, wherein the cryptographic API call includes a pseudo-random number generator that uses a deterministic algorithm and a seed to generate a pseudo-random number, and wherein the first variable is the seed.

3. The method of claim 1, wherein identifying the cryptographic API call comprises:

accessing a library used by the program;
analyzing a list of API calls in the library;
detecting one or more cryptographic API calls in the list of API calls, the one or more cryptographic API calls including the cryptographic API call; and
determining, by performing static analysis on the source code, that the cryptographic API call is in the source code.

4. The method of claim 1, wherein tagging the first variable comprises:
   generating, by the processor, a taint tag for the first variable, the taint tag indicating that the first variable is not cryptographically secure;
   inserting the taint tag in the source code;
   generating a list of tainted variables and associated taint tags, the list of tainted variables including the first variable;
   allocating memory space for the program to store the list of tainted variables; and
   storing the list of tainted variables in the allocated memory space.

5. The method of claim 1, wherein replacing the first variable with the second variable during execution comprises:
   generating the second variable, wherein the second variable is cryptographically secure;
   removing the first variable from the cryptographic API call; and
   inserting the second variable into the cryptographic API call.

6. The method of claim 1, further comprising:
   identifying a second cryptographic API call, the second cryptographic API call having a third variable;
   determining that the third variable is generated using a cryptographically secure pseudo-random number generator;
   determining, in response to the third variable being generated using a cryptographically secure pseudo-random number generator, that the third variable is cryptographically secure; and
   executing the second cryptographic API call with the third variable as an input.

7. A system comprising:
   a memory; and
   a processor in communication with the memory, the processor being configured to perform operations comprising:
   identifying a cryptographic application program interface (API) call in a source code for a program, the cryptographic API call having a first variable as an input;
   determining that the first variable is a static value, wherein determining the first variable is the static value includes performing a static analysis of the program, the static analysis including a backward slice of the input of the cryptographic API call, and wherein performing the static analysis of the program comprises:
      examining one or more statements in the program that affect the first variable, and
      determining whether the one or more statements cause the first variable to be a cryptographically secure value;
   generating a second variable using a cryptographically secure pseudo-random number generator; and
   replacing the first variable with the second variable.

8. The system of claim 7, wherein the cryptographic API call includes a pseudo-random number generator that uses a deterministic algorithm and a seed to generate a pseudo-random number, wherein the first variable is the seed, and wherein the memory includes a compiler, the method further comprising: compiling the source code for the program to generate object code.

9. The system of claim 7, wherein identifying the cryptographic API call comprises:
  accessing a library used by the program;
  analyzing a list of API calls in the library;
  detecting one or more cryptographic API calls in the list of API calls, the one or more cryptographic API calls including the cryptographic API call; and
  determining, by performing static analysis on the source code, that the cryptographic API call is in the source code.

10. The system of claim 7, the operations further comprising tagging the first
  variable, wherein tagging the first variable comprises:
  generating, by the processor, a taint tag for the first variable, the taint tag indicating that the first variable is not cryptographically secure;
  inserting the taint tag in the source code;
  generating a list of tainted variables and associated taint tags, the list of tainted variables including the first variable;
  allocating memory space for the program to store the list of tainted variables; and
  storing the list of tainted variables in the allocated memory space.

11. The system of claim 7, wherein replacing the first variable with the second variable comprises:
  removing the first variable from the cryptographic API call; and
  inserting the second variable into the cryptographic API call.

12. The system of claim 7, further comprising:
  identifying a second cryptographic API call, the second cryptographic API call having a third variable;
  determining that the third variable is generated using a cryptographically secure pseudo-random number generator; and
  determining, in response to the third variable being generated using a cryptographically secure pseudo-random number generator, that the third variable is cryptographically secure.

13. A computer program product comprising a computer readable storage medium having program instructions embodied therewith, the program instructions executable by a processor to cause the processor to perform a method, the method comprising:
  identifying, by the processor, that a cryptographic application program interface (API) call in a program is scheduled to be executed, the cryptographic API call having a first variable as an input;
  determining that the first variable is a static value, wherein determining the first variable is the static value includes performing a static analysis of the program, the static analysis including a backward slice of the input of the cryptographic API call, and wherein performing the static analysis of the program comprises:
    examining, by the processor, one or more statements in the program that affect the first variable, and
    determining whether the one or more statements, when executed, cause the first variable to be a cryptographically secure value;
  replacing the first variable with a second variable during execution of the program; and
  executing the cryptographic API call with the second variable as the input.

14. The computer program product of claim 13, wherein the cryptographic API call includes a pseudo-random number generator that uses a deterministic algorithm and a seed to generate a pseudo-random number, and wherein the first variable is the seed.

15. The computer program product of claim 13, further comprising determining that the cryptographic API call in the source code for the program is being executed.

16. The computer program product of claim 15, wherein determining that the cryptographic API call in the source code for the program will be executed comprises:
  accessing a library used by the program;
  analyzing a list of API calls in the library;
  detecting one or more cryptographic API calls in the list of API calls, the one or more cryptographic API calls including the cryptographic API call; and
  identifying the cryptographic API call is in the source code.

17. The computer program product of claim 13, wherein replacing the first variable with the second variable during execution comprises:
  generating the second variable using the pseudo-random number generator;
  removing the first variable from the cryptographic API call; and
  inserting the second variable into the cryptographic API call.

18. The computer program product of claim 13, further comprising:
  identifying a second cryptographic API call, the second cryptographic API call having a third variable;
  determining that the third variable is generated using a cryptographically secure pseudo-random number generator;
  determining, in response to the third variable being generated using a cryptographically secure pseudo-random number generator, that the third variable is cryptographically secure; and
  executing the second cryptographic API call with the third variable as the input.

* * * * *